T. L. BURTON.
SLACK ADJUSTER.
APPLICATION FILED NOV. 6, 1917.

1,309,934.

Patented July 15, 1919.
2 SHEETS—SHEET 1.

INVENTOR
Thomas L. Burton
by Edward H. Wright.
Atty.

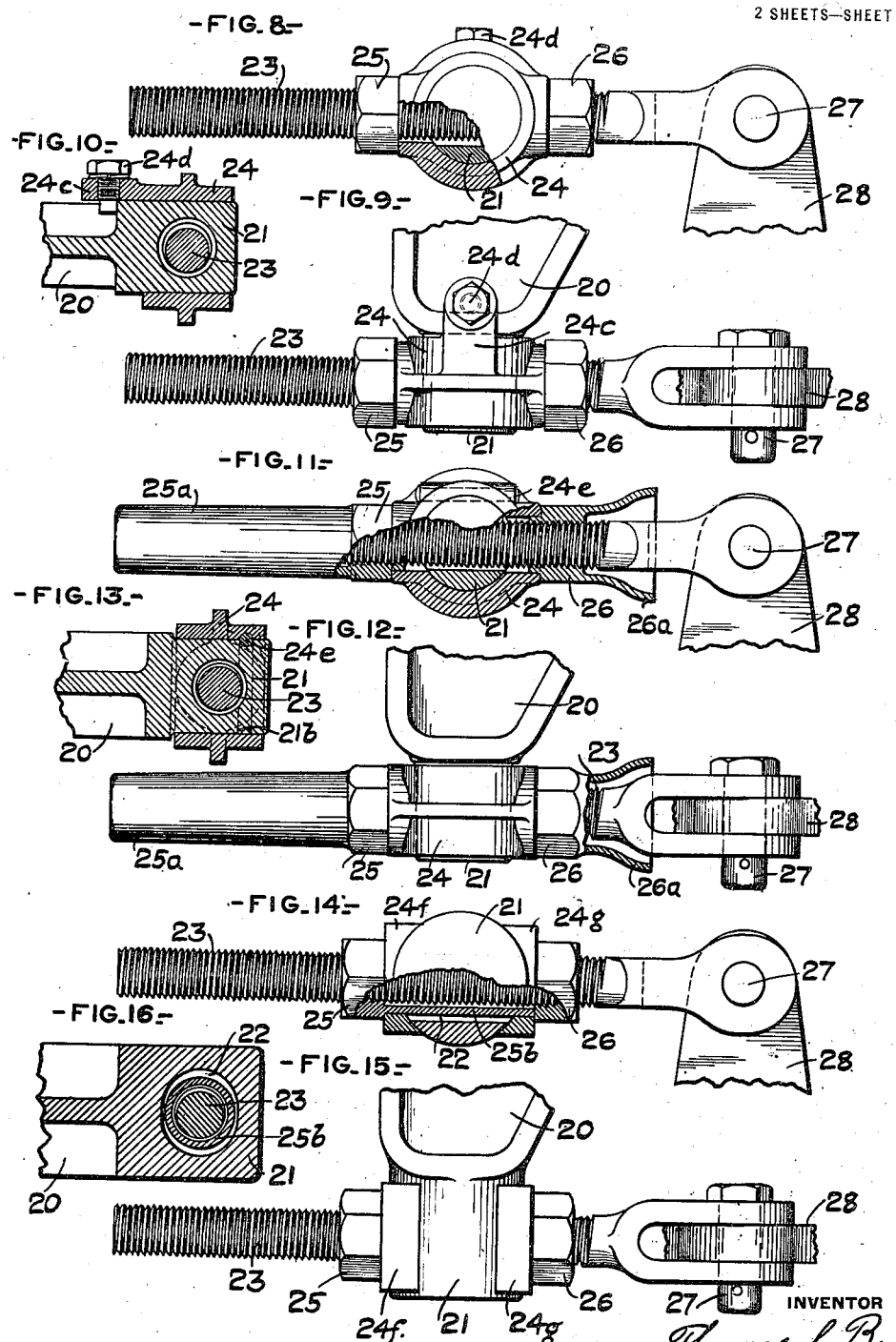

UNITED STATES PATENT OFFICE.

THOMAS L. BURTON, OF ST. LOUIS, MISSOURI, ASSIGNOR TO AMERICAN BRAKE COMPANY, OF ST. LOUIS, MISSOURI, A CORPORATION OF MISSOURI.

SLACK-ADJUSTER.

1,309,934.

Specification of Letters Patent.  Patented July 15, 1919.

Application filed November 6, 1917. Serial No. 200,500.

*To all whom it may concern:*

Be it known that I, THOMAS L. BURTON, a citizen of the United States, residing at St. Louis, in the State of Missouri, have invented a certain new and useful Improvement in Slack-Adjusters, of which improvement the following is a specification.

This invention relates to means for taking up the slack in the brake rigging of railway cars and trucks, due to the wear of the brake shoes, wheels, and the other parts of the brake rigging, and more particularly to that type of slack adjusters having a manually adjustable screw for shifting the fulcrum of a truck lever of the brake system.

The principal object of my invention is to provide a simple, durable and compact construction of this type, and one in which the longitudinally adjustable screw is mounted to have a limited swinging or tilting movement whereby it may be readily adjusted to the desired position without binding or bending said screw.

In the accompanying drawings: Figure 1 is a side elevation, partly in section, illustrating one form of slack adjusting device embodying my improvement; Fig. 2, a plan; Fig. 3, a transverse section; Fig. 4, a view similar to Fig. 1, but showing an adjusting nut with a hollow projection for inclosing the end of the screw; Figs. 5, 6, and 7, a side elevation partly in section, a plan, and a transverse section, respectively, showing a modification; Figs. 8, 9 and 10, similar views showing another slight modification; Figs. 11, 12 and 13, similar views respectively showing a further modification; and Figs. 14, 15 and 16 similar views showing a still further modification.

According to the construction shown in Figs. 1, 2, 3, and 4, my improved slack adjusting device comprises a fulcrum bracket, 20, adapted to be rigidly secured to the truck frame in any suitable manner and carrying a trunnion, 21, having an opening, 22, for the adjusting screw, 23. On the trunnion is rotatably mounted the collar, 24, also having openings for the adjusting screw, and provided with transverse plane bearing surfaces around said openings adapted to be engaged by the adjusting nut 25, on one side and the lock nut, 26, on the other side when the screw is clamped in any given position. The openings through the collar and through the trunnion are of somewhat larger diameter than the screw, as indicated, to provide a clearance and allow for a limited tilting movement of the collar and adjusting screw relative to the fulcrum bracket.

The adjusting screw carries at one end the pivot pin 27 for the fulcrum of the dead truck lever 28 of the brake rigging, and the slack may be adjusted or taken up by manually setting the adjusting and lock nuts for shifting the screw longitudinally and thereby moving the fulcrum or the truck lever the desired amount, as will be readily understood. In order to protect the screw from dirt the adjusting nut, 25, may be provided with a hollow extension, 25$^a$, for inclosing the end of the screw, as indicated in Fig. 4.

According to the modification shown in Figs. 5, 6 and 7, the collar mounted on the trunnion is formed in two semi-cylindrical sections, 24$^a$ and 24$^b$, divided upon a vertical plane and the trunnion, 21, is provided with an outer rib or flange, 21$^a$, which holds the collar in position. The adjusting nut and the lock nut are also shown as provided with shoulders and cylindrical projections extending within the openings in the collar sections around the adjusting screw. This forms a more rigid connection between the collar sections and the nuts and spaces the sections from the screws.

In the modification shown in Figs. 8, 9 and 10, the design is the same as that shown in Figs. 1, 2 and 3, except that the collar, 24, is provided with a lug 24$^c$, carrying a set screw, 24$^d$, engaging a shoulder of the fulcrum bracket for holding the collar in position.

The construction shown in Figs. 11, 12 and 13 is substantially the same as that of Figs. 1, 2 and 3, except that the collar, 24, is provided with a pin, 24$^e$, engaging a groove, 21$^b$, in the trunnion, 21, which also prevents longitudinal movement of the collar upon the trunnion. The lock nut, 26, is also indicated as having an extension, 26$^a$, for covering the inner threaded portion of the screw to protect the same from dirt and dust.

In the modification shown in Figs. 14, 15 and 16, the collar member is composed of two segmental sections, 24$^f$, and 24$^g$, bearing upon opposite sides of the trunnion, 21, though not necessarily reaching completely around the same, and the adjusting nut, 25, is provided with a hollow cylindrical projection or sleeve, 25ᵇ, extending through both of said sections and the opening through the trunnion around the screw. In this design the opening, 22, through the trunnion provides a clearance space around the cylindrical extension, 25ᵇ, and permits a limited tilting movement of the screw upon the trunnion while at the same time the threads of the screw are protected.

The sleeve, 25ᵇ, is preferably formed integral with one of the nuts, such as the adjusting nut, 25, and is adapted to make a snug fit within the openings in the segmental collar sections so that when the parts are clamped together by screwing up the nuts the sections will be rigidly secured together and the limited tilting movement on the trunnion is provided by the clearance space within the opening, 22, and outside of said sleeve. In this case the sleeve protects the threads of the screw from jamming against the trunnion when the screw is tilted at a certain angle to the horizontal.

What I claim as new and desire to secure by Letters Patent is:

1. A slack adjuster comprising a rigid bracket attached to the truck frame and having a trunnion, a collar mounted to have a limited swinging movement thereon, and an adjusting screw supported on said collar.

2. A slack adjuster comprising a bracket, having a trunnion, a collar rotatably mounted thereon, an adjusting screw extending through said collar and trunnion, and an adjusting nut for said screw.

3. A slack adjuster comprising a bracket, having a trunnion provided with a transverse opening, a collar rotatably mounted on said trunnion and also provided with openings, an adjusting screw of smaller diameter than said openings extending through the same, and an adjusting nut for said screw.

4. A slack adjuster comprising a bracket, having a trunnion, a collar rotatably mounted thereon, an adjusting screw extending through said collar and trunnion, an adjusting nut for the screw at one side of the bracket, and a lock nut at the other side.

5. A slack adjuster comprising a bracket, having a trunnion provided with a transverse opening, a collar rotatably mounted on said trunnion and also provided with openings, an adjusting screw of smaller diameter than said openings extending through the same, an adjusting nut on said screw at one side of the collar, and a lock nut at the other side.

6. A slack adjuster comprising a bracket, having a trunnion, a collar formed of two sections bearing upon opposite sides of said trunnion, an adjusting screw extending through said sections and the trunnion, and an adjusting nut for said screw.

7. A slack adjuster comprising a bracket, having a trunnion, a collar formed of two sections bearing upon opposite sides of said trunnion, an adjusting screw extending through said sections and the trunnion, an adjusting nut mounted on said screw, and a hollow cylindrical sleeve extending through said sections and trunnion around said screw.

8. A slack adjuster comprising a bracket, having a trunnion, provided with a transverse opening, a collar formed of two sections also provided with corresponding openings and bearing upon opposite sides of said trunnion, an adjusting nut, a sleeve extending through said openings in the sections and the trunnion around the screw, and a lock nut for the screw at the other end of said sleeve.

In testimony whereof I have hereunto set my hand.

THOMAS L. BURTON.